US012604311B2

(12) United States Patent
Zhang et al.

(10) Patent No.: US 12,604,311 B2
(45) Date of Patent: Apr. 14, 2026

(54) SCHEDULING METHOD, BASE STATION AND STORAGE MEDIUM

(71) Applicant: ZTE CORPORATION, Shenzhen (CN)

(72) Inventors: Yunpeng Zhang, Shenzhen (CN); Yusen Zhang, Shenzhen (CN); Tao Kang, Shenzhen (CN); Junli Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 523 days.

(21) Appl. No.: 18/042,071

(22) PCT Filed: Aug. 12, 2021

(86) PCT No.: PCT/CN2021/112316
§ 371 (c)(1),
(2) Date: Feb. 17, 2023

(87) PCT Pub. No.: WO2022/037476
PCT Pub. Date: Feb. 24, 2022

(65) Prior Publication Data
US 2024/0015734 A1      Jan. 11, 2024

(30) Foreign Application Priority Data

Aug. 17, 2020      (CN) .......................... 202010827680.X

(51) Int. Cl.
*H04W 72/1268*      (2023.01)

(52) U.S. Cl.
CPC .............................. *H04W 72/1268* (2013.01)

(58) Field of Classification Search
CPC .................................................. H04W 72/1268
See application file for complete search history.

(56) References Cited

U.S. PATENT DOCUMENTS 9,414,241 B2      8/2016  Ge et al.
10,305,627 B2*    5/2019  Li ........................ H04L 1/0003
2013/0022202 A1   1/2013  Stroud
(Continued)

FOREIGN PATENT DOCUMENTS

CN        106656411 A        5/2017
CN        107466105 A        12/2017
(Continued)

OTHER PUBLICATIONS

European Patent Office. Extended European Search Report for EP Application No. 21857571.0, mailed Nov. 8, 2023, pp. 1-9.
(Continued)

*Primary Examiner* — Jason E Mattis
(74) *Attorney, Agent, or Firm* — Vivacqua Crane, PLLC

(57) ABSTRACT

A scheduling method, a base station and a storage medium are disclosed. The scheduling method may include: sending uplink service scheduling information to a terminal device (S210); acquiring data information sent by the terminal device according to the uplink service scheduling information through a physical uplink shared channel (PUSCH) (S220); determining a layer number of uplink service scheduling according to the data information (S230); and scheduling an uplink service according to the layer number of uplink service scheduling (S240).

20 Claims, 5 Drawing Sheets

Start a timer `~S410`

In a case of re-acquiring data information sent by a terminal device according to uplink service scheduling information through a PUSCH, in response to the timer having not timed out, determine a layer number of downlink service scheduling as a layer number of uplink service scheduling `~S420`

(56)                References Cited

U.S. PATENT DOCUMENTS

| | | | |
|---|---|---|---|
| 2014/0241192 A1 | 8/2014 | Kim et al. | |
| 2014/0307645 A1 | 10/2014 | Ji et al. | |
| 2016/0285536 A1 | 9/2016 | Gutierrez et al. | |
| 2019/0165841 A1* | 5/2019 | Dong .................. | H04B 7/0417 |
| 2019/0253925 A1* | 8/2019 | Gholmieh .............. | H04B 1/005 |
| 2019/0394828 A1* | 12/2019 | Lei ........................ | H04B 7/063 |

FOREIGN PATENT DOCUMENTS

| | | | |
|---|---|---|---|
| CN | 107592273 A | 1/2018 | |
| CN | 108809545 A | 11/2018 | |
| CN | 109802806 A | 5/2019 | |
| CN | 109995497 A | 7/2019 | |
| CN | 110838904 A | 2/2020 | |
| CN | 111182658 A | 5/2020 | |
| WO | 2019155249 A1 | 8/2019 | |

OTHER PUBLICATIONS

International Searching Authority. International Search Report and Written Opinion for PCT Application ho. PCT/CN2021/112316 and English translation, mailed Oct. 28, 2021, pp. 1-10.
The State Intellectual Property Office of People's Republic of China. First Office Action for CN Application No. 202010827680X and English translation, mailed Dec. 27, 2021, pp. 1-13.
The State Intellectual Property Office of People's Republic of China. First Search Report for CN Application No. 202010827680X and English translation, mailed Dec. 21, 2021, pp. 1-5.
The State Intellectual Property Office of People's Republic of China. Supplementary Search Report for CN Application No. 202010827680X and English translation, mailed Mar. 4, 2022, pp. 1-4.

\* cited by examiner

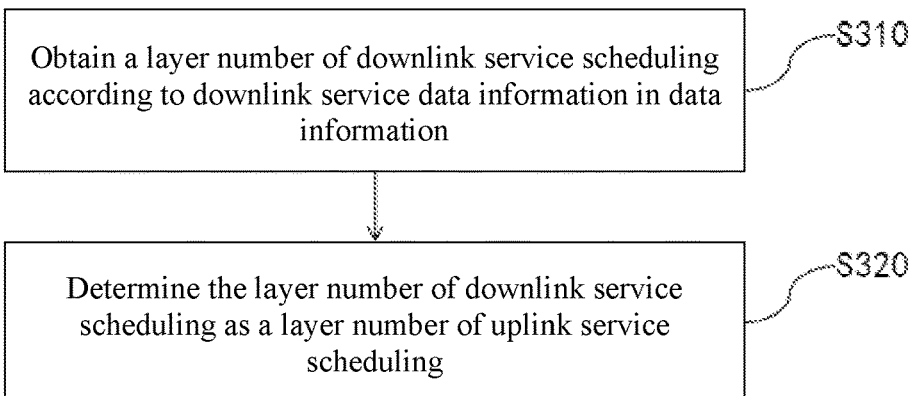

Obtain a layer number of downlink service scheduling according to downlink service data information in data information —S310

Determine the layer number of downlink service scheduling as a layer number of uplink service scheduling —S320

Fig. 3

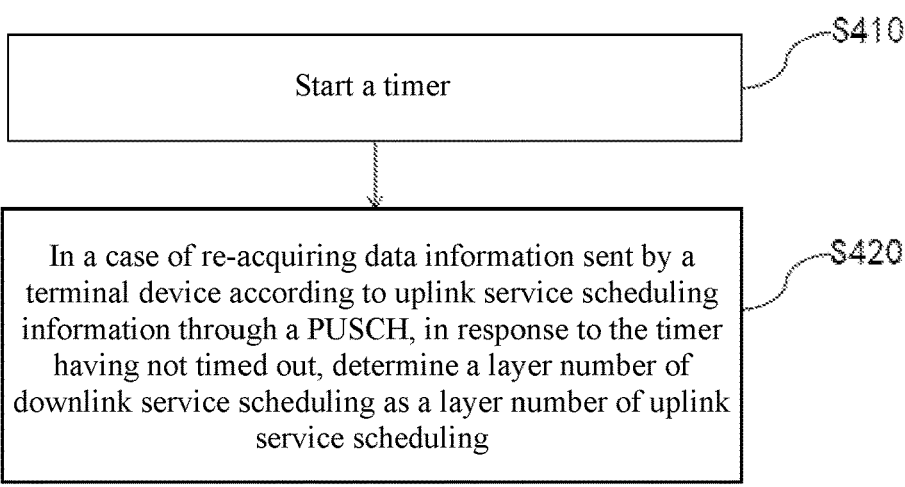

Start a timer —S410

In a case of re-acquiring data information sent by a terminal device according to uplink service scheduling information through a PUSCH, in response to the timer having not timed out, determine a layer number of downlink service scheduling as a layer number of uplink service scheduling —S420

Fig. 4

In response to a timer having timed out, determine a layer number of uplink service scheduling according to uplink service data information in data information —S510

Fig. 5

Determine a layer number of uplink service scheduling according to uplink service data information in data information —S610

Fig. 6

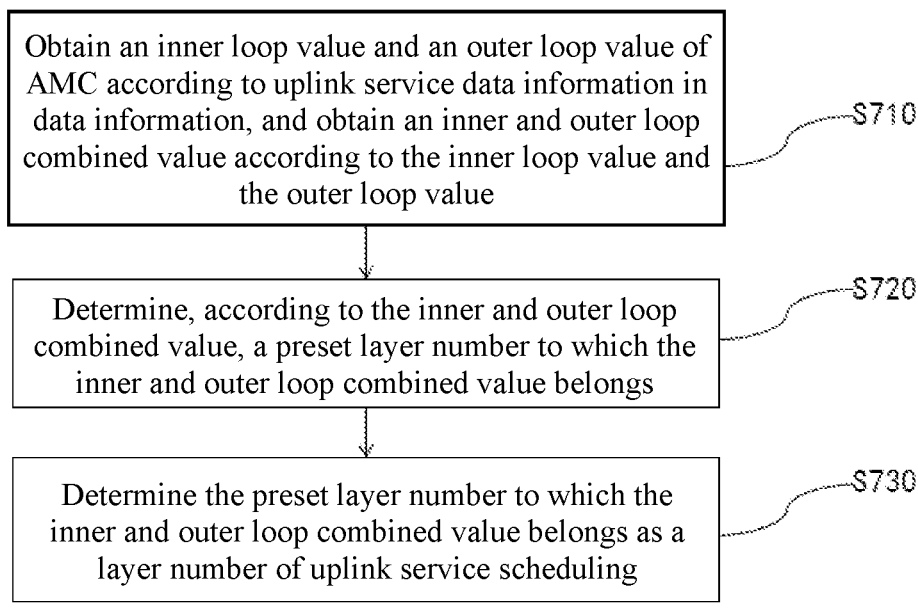

Obtain an inner loop value and an outer loop value of AMC according to uplink service data information in data information, and obtain an inner and outer loop combined value according to the inner loop value and the outer loop value ⟋S710

Determine, according to the inner and outer loop combined value, a preset layer number to which the inner and outer loop combined value belongs ⟋S720

Determine the preset layer number to which the inner and outer loop combined value belongs as a layer number of uplink service scheduling ⟋S730

Fig. 7

In response to an inner and outer loop combined value being in a decision threshold interval corresponding to the $j^{th}$ layer in preset layer numbers, determine that a preset layer number to which an inner and outer loop combined value belongs is the $j^{th}$ layer, where j is a positive integer ⟋S810

Fig. 8

In response to an inner and outer loop combined value being not in a decision threshold interval corresponding to the $j^{th}$ layer in preset layer numbers, update the $j^{th}$ layer to the $(j+1)^{th}$ layer until the inner and outer loop combined value is in a decision threshold interval corresponding to the $(j+1)^{th}$ layer, and determine that a preset layer number to which the inner and outer loop combined value belongs is the $(j+1)^{th}$ layer ⟋S910

Fig. 9

SCHEDULING METHOD, BASE STATION AND STORAGE MEDIUM

CROSS-REFERENCE TO RELATED APPLICATION

This application is a national stage filing under 35 U.S.C. § 371 of international application number PCT/CN2021/112316, filed Aug. 12, 2021, which claims priority to Chinese patent application No. 202010827680.X filed on Aug. 17, 2020. The contents of these applications are incorporated herein by reference in their entirety.

TECHNICAL FIELD

The embodiments of the present disclosure relate to but are not limited to the aeronautical communication field, and in particular to a scheduling method, a base station and a storage medium.

BACKGROUND

At present, there are two main technical schemes of aeronautical communication, one is satellite communication, and the other is Air To Ground (ATG) communication. The satellite communication scheme features wide coverage of both land and sea, but also high deployment and operation costs and a large network delay. The ATG communication scheme can only be deployed on land, but it has the advantages of low cost, high transmission rate, small delay and fast iterative upgrade of technology.

The ATG communication system adopts customized wireless transceiver devices, sets up ground base stations and ground-to-air antennas along flight routes or specific airspace, and establishes ground-to-air communication links to access the Internet. In an engine room, onboard ATG devices provide passengers with wireless local area network (WLAN) data services, and users can establish connections with the onboard ATG devices through Wireless Fidelity (Wi-Fi), while outside the engine room, data links between ground base stations and the onboard ATG devices are established through a 5G network.

To ensure intensive traffic of uplink service data of the users, the existing base stations usually schedule uplink multi-layer data based on sounding reference signal (SRS) measurement results sent by the onboard ATG device. However, due to the deployment of ground macro stations, uplink SRS slots of ground-to-air communication will be interfered with by downlink slots for transmitting service data of the ground macro stations, which results in inaccurate SRS measurement results, and further cause the 5G ATG communication system to fail to realize accurate scheduling of uplink multi-layer data.

SUMMARY

Embodiments of the present disclosure provide a scheduling method, a base station and a storage medium.

In accordance with a first aspect of the present disclosure, an embodiment provides a scheduling method, which may include: sending uplink service scheduling information to a terminal device; acquiring data information sent by the terminal device according to the uplink service scheduling information through a physical uplink shared channel (PUSCH); determining a layer number of uplink service scheduling according to the data information; and scheduling an uplink service according to the layer number of uplink service scheduling.

In accordance with a second aspect of the present disclosure, an embodiment provides a base station, which may include a memory, a processor, and a computer program stored in the memory and executable by the processor, where the computer program, when executed by the processor, causes the processor to implement the scheduling method described above.

In accordance with a third aspect of the present disclosure, an embodiment provides a computer-readable storage medium storing an information processing program which, when executed by a processor, causes the processor to implement the scheduling method described above.

BRIEF DESCRIPTION OF DRAWINGS

FIG. 3 is a flowchart of determining a layer number of uplink service scheduling according to data information, according to a scheduling method provided by another embodiment of the present disclosure;

FIG. 4 is a flowchart of steps after determining a layer number of downlink service scheduling as a layer number of uplink service scheduling, according to a scheduling method provided by another embodiment of the present disclosure;

FIG. 5 is a flowchart existing after determining a layer number of downlink service scheduling as a layer number of uplink service scheduling, according to a scheduling method provided by another embodiment of the present disclosure;

FIG. 6 is a flowchart of determining a layer number of uplink service scheduling according to data information, according to a scheduling method provided by another embodiment of the present disclosure;

FIG. 7 is a flowchart of determining a layer number of uplink service scheduling according to uplink service data information in data information, according to a scheduling method provided by another embodiment of the present disclosure;

FIG. 8 is a flowchart of determining, according to an inner and outer loop combined value, a preset layer number to which the inner and outer loop combined value belongs, according to a scheduling method provided by another embodiment of the present disclosure;

FIG. 9 is a flowchart of determining, according to an inner and outer loop combined value, a preset layer number to which the inner and outer loop combined value belongs, according to a scheduling method provided by another embodiment of the present disclosure;

DETAILED DESCRIPTION

In order to make the objectives, technical schemes and advantages of the present disclosure apparent, the present disclosure is described in detail in conjunction with the accompanying drawings and embodiments. It should be understood that the particular embodiments described herein are only intended to explain the present disclosure, and are not intended to limit the present disclosure.

It is to be noted that although a functional module division is shown in the schematic diagrams of the device and a logical order is shown in the flowcharts, the steps shown or described may be executed, in some cases, in a different module division from that of the device or in a different order from that in the flowcharts.

This embodiment has provided a scheduling method, a base station and a storage medium. The scheduling method includes: sending, by a base station, uplink service scheduling information to a terminal device; acquiring data information sent by the terminal device according to the uplink service scheduling information through a PUSCH; determining a layer number of uplink service scheduling according to the data information; and scheduling an uplink service according to the layer number of uplink service scheduling. Compared with a scheduling method based on SRS information in some cases, the method in which the base station schedules the terminal device by using the data information sent through the PUSCH in this embodiment of the present disclosure is more accurate, thereby improving accuracy of uplink data scheduling in a 5G ATG communication system.

The embodiments of the present disclosure will be further explained below with reference to the accompanying drawings.

Figure 1:
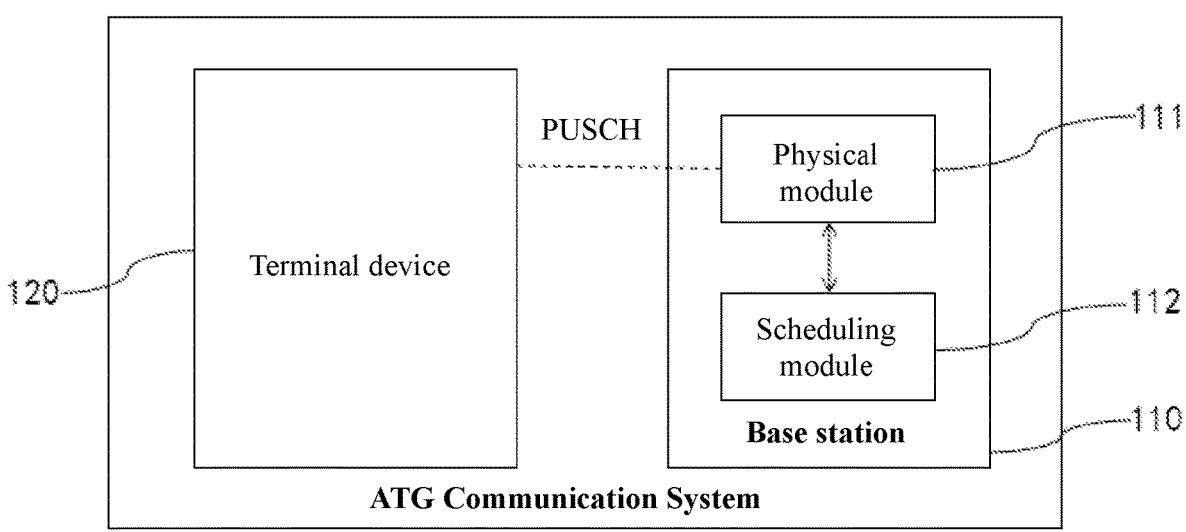
FIG. 1 is a schematic diagram of an ATG communication system provided by an embodiment of the present disclosure.

In an embodiment, referring to FIG. 1, a schematic diagram of an ATG communication system provided by an embodiment of the present disclosure is depicted. The ATG communication system may include a base station 110 and a terminal device 120. Wireless communication can be achieved between the base station 110 and the terminal device 120 to complete data interaction.

In an embodiment, the base station 110 may include a physical module 111 and a scheduling module 112. The physical module 111 can be configured to measure and demodulate data information sent by the terminal device 120 through the PUSCH, to obtain a measurement result of channel quality and an Acknowledgment (ACK)/Negative Acknowledgment (NACK) result respectively. The scheduling module 112 can obtain an inner loop value of Adaptive Modulation and Coding (AMC) according to the measurement result of channel quality, and can also obtain an outer loop value of AMC according to ACK/NACK. The scheduling module 112 can sum the inner loop value and the outer loop value of AMC to obtain an inner and outer loop combined value.

In an embodiment, the terminal device 120 can be configured to receive uplink service scheduling information sent by the base station 110 to the terminal device 120, send data information to the base station 110 according to the uplink service scheduling information through the PUSCH, receive a layer number of uplink service scheduling determined by the base station 110 according to the data information, and receive data sent by the base station 110 according to the layer number of uplink service scheduling.

It should be noted that the base station 110 may be an ATG ground base station 110, and the ATG ground base station 110 may include a ground antenna installed on a tower of a telecommunication service provider and a baseband device at a site of the telecommunication service provider, which is not uniquely limited in this embodiment.

It should be noted that the terminal device 120 may be an onboard ATG transceiver which can transmit data to the ATG ground base station 110 in real time. This is not uniquely limited in this embodiment.

Figure 2:
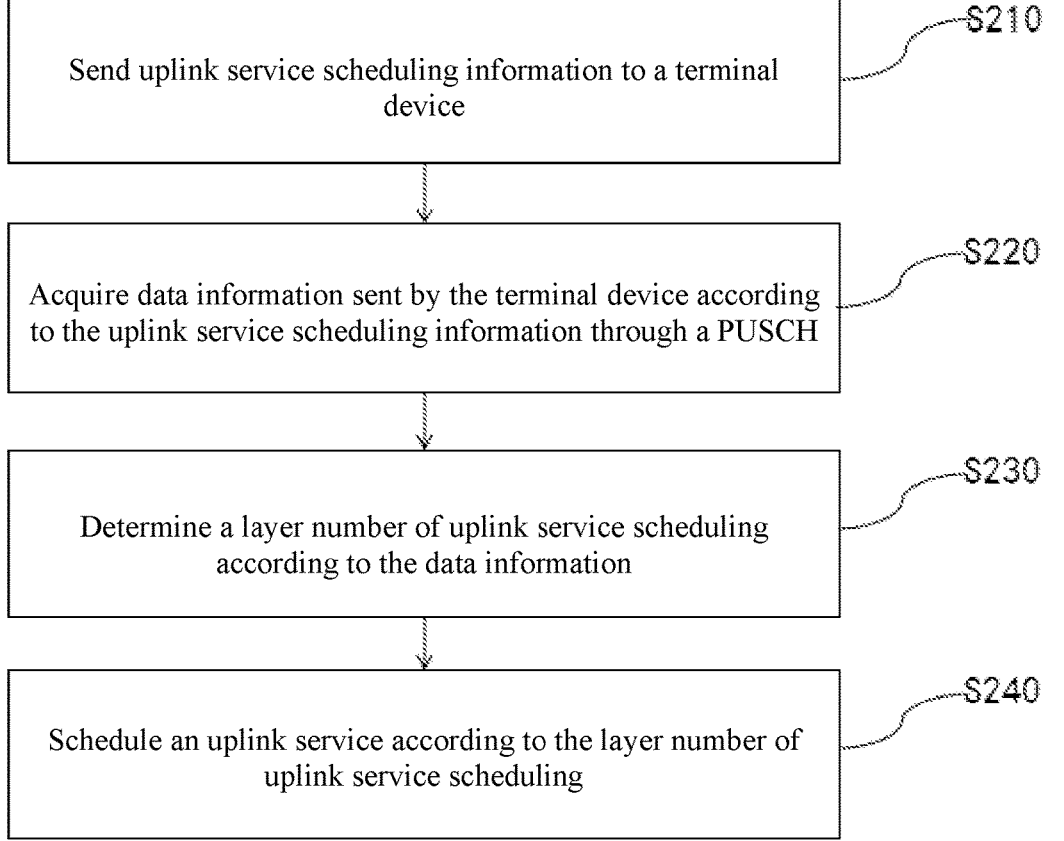
FIG. 2 is a flowchart of a scheduling method provided by an embodiment of the present disclosure.

As shown in FIG. 2, a flowchart of a scheduling method according to an embodiment is depicted. The scheduling method is applied to a base station. In an embodiment, the scheduling method includes but is not limited to the following steps.

At S210, uplink service scheduling information is sent to a terminal device.

In an embodiment, when the base station needs to perform information scheduling for the terminal device, the base station may send the uplink service scheduling information to the terminal device which has completed an access process with the base station.

It should be noted that the base station may periodically send the uplink service scheduling information to the terminal device or irregularly send the uplink service scheduling information to the terminal device according to an actual requirement, which is not specifically limited in this embodiment.

At S220, data information sent by the terminal device according to the uplink service scheduling information through a PUSCH is acquired.

In an embodiment, after the base station sends the uplink service scheduling information to the terminal device, the terminal device may send data information to the base station through the PUSCH, and the base station obtains the data information. Since the data information is sent through the PUSCH, the terminal device verifies the data information before sending to ensure accuracy of the data information and then sends the data information to the base station. Therefore, the data information obtained by the base station is accurate, facilitating the next step of the scheduling method.

It should be noted that the data information may include downlink service data information or uplink service data information, or include both downlink service data information and uplink service data information, which is not specifically limited in this embodiment.

At S230, a layer number of uplink service scheduling is determined according to the data information.

In an embodiment, the base station can measure and demodulate the data information according to the acquired data information, so as to determine the layer number of uplink service scheduling.

It should be noted that the layer number is separated in a physical channel fed back to the base station. More layers indicate a greater amount of data that can be transmitted at the same time.

It should be noted that the layer number is expressed as a positive integer, and an upper limit of the layer number is determined according to distributable resources in the base station, which is not uniquely limited in this embodiment.

At S240, an uplink service is scheduled according to the layer number of uplink service scheduling.

In an embodiment, the base station can schedule the uplink service of the terminal device according to the layer number of uplink service scheduling determined in the above step, so as to ensure intensive-traffic transmission of uplink services in a 5G ground-to-air system.

In an embodiment, by using S210 to S240, the base station may send the uplink service scheduling information to the terminal device; acquire the data information sent by the terminal device according to the uplink service scheduling information through the PUSCH; determine the layer number of uplink service scheduling according to the data information; and schedules the uplink service according to the layer number of uplink service scheduling. Compared with a scheduling method based on SRS information in some cases, the method in which the base station schedules the terminal device by using the data information sent through the PUSCH in this embodiment of the present disclosure is more accurate, thereby improving accuracy of uplink data scheduling in a 5G ATG communication system.

Referring to FIG. 3, the data information includes downlink service data information. In an embodiment, S230 includes, but is not limited to, the following steps.

At S310, a layer number of downlink service scheduling is obtained according to the downlink service data information in the data information.

In an embodiment, the base station may obtain the layer number of downlink service scheduling according to the acquired downlink service data information in the data information sent by the terminal device through the PUSCH.

At S320, the layer number of downlink service scheduling is determined as the layer number of uplink service scheduling.

In an embodiment, if a scheduling module of the base station can obtain the layer number of downlink service scheduling, the layer number of downlink service scheduling can be determined as the layer number of uplink service scheduling. Then, the base station can schedule the uplink service according to the determined layer number of uplink service scheduling. Compared with a scheduling method based on SRS information in some cases, the method in which the base station schedules the terminal device by using the data information sent through the PUSCH in this embodiment of the present disclosure is more accurate, thereby improving accuracy of uplink data scheduling in the 5G ATG communication system. In addition, uplink data scheduling can be performed more quickly and accurately by directly determining the layer number of downlink service scheduling as the layer number of uplink service scheduling.

In an embodiment, through S310 and S320, when the scheduling module of the base station determines that the layer number of downlink service scheduling is obtained, the layer number of downlink service scheduling can be determined as the layers count of uplink service scheduling, so that the base station can schedule the uplink service according to the determined layer number of uplink service scheduling.

Referring to FIG. 4, in an embodiment, S320 is followed by the following steps.

At S410, a timer is started.

In an embodiment, after the layer number of downlink service scheduling is determined as the layer number of uplink service scheduling, a timer may be started for timing.

At S420, in a case of re-acquiring the data information sent by the terminal device according to the uplink service scheduling information through the PUSCH, in response to the timer having not timed out, the layer number of downlink service scheduling is determined as the layer number of uplink service scheduling.

In an embodiment, in the case that the base station re-acquires the data information sent by the terminal device according to the uplink service scheduling information through the PUSCH, in response to the timer having not timed out, the base station can continue to determine the layer number of downlink service scheduling as the layer number of uplink service scheduling, and then schedules the uplink service according to the determined layer number of uplink service scheduling. This improves accuracy of uplink data scheduling of the 5G ATG communication system.

In an embodiment, through S410 and S420, when the layer number of downlink service scheduling is determined as the layer number of uplink service scheduling, the timer may be started for timing. In the case that the base station re-acquires the data information, in response to the timer having not timed out, the base station can continue to determine the layer number of downlink service scheduling as the layer number of uplink service scheduling, and then schedules the uplink service according to the determined layer number of uplink service scheduling. This improves accuracy of uplink data scheduling of the 5G ATG communication system.

Referring to FIG. 5, when the data information further includes uplink service data information, in an embodiment, after S420, the method further includes, but is not limited to, the following step.

At S510, in response to the timer having timed out, the layer number of uplink service scheduling is determined according to the uplink service data information in the data information.

In an embodiment, once the timer times out, it is indicated that the layer number of downlink service scheduling is no longer suitable for a current need of uplink service scheduling, and in this case, the base station can determine the layer number of uplink service scheduling according to the uplink service data information in the data information. This can ensure intensive-traffic transmission of uplink services in the 5G ground-to-air system.

Referring to FIG. 6, when the data information includes uplink service data information, in an embodiment, S230 includes, but is not limited to, the following step.

At S610, the layer number of uplink service scheduling is determined according to the uplink service data information in the data information.

In an embodiment, when the data information includes uplink service data information but excludes downlink service data information, the base station can determine the layer number of uplink service scheduling according to the uplink service data information, thereby improving accuracy of uplink data scheduling of the 5G ATG communication system.

Referring to FIG. 7, in an embodiment, determining of the layer number of uplink service scheduling according to the uplink service data information in the data information in S510 or S610 includes but is not limited to the following steps.

At S710, an inner loop value and an outer loop value of adaptive modulation and coding (AMC) are obtained according to the uplink service data information in the data information, and an inner and outer loop combined value is obtained according to the inner loop value and the outer loop value.

In an embodiment, the base station can measure and demodulate the uplink service data information acquired from the terminal device to obtain the inner loop value and the outer loop value of AMC respectively, and can sum the inner loop value and the outer loop value of the AMC to obtain the inner and outer loop combined value.

In an embodiment, a physical module of the base station can measure and demodulate the uplink service data information acquired from the terminal device to obtain a measurement result of channel quality and an ACK/NACK result respectively. The physical module may send the measurement result of channel quality and the ACK/NACK result to the scheduling module, so that the scheduling module can obtain the inner loop value of AMC according to the measurement result of channel quality, and the scheduling module can also obtain the outer loop value of AMC according to the ACK/NACK result. The scheduling module can sum the inner loop value and the outer loop value of AMC to obtain the inner and outer loop combined value, which prepares data for the next step.

At S720, a preset layer number to which the inner and outer loop combined value belongs is determined according to the inner and outer loop combined value.

In an embodiment, the scheduling module of the base station can determine, according to the inner and outer loop combined value, the preset layer number to which the inner and outer loop combined value belongs. To be specific, different decision threshold intervals may be set for different preset layer numbers. When the inner and outer loop combined value belongs to a specific decision threshold interval, the preset layer number to which the inner and outer loop combined value belongs can be determined as a layer number corresponding to the decision threshold interval.

At S730, the preset layer number to which the inner and outer loop combined value belongs is determined as the layer number of uplink service scheduling.

In an embodiment, the base station can determine the preset layer number to which the inner and outer loop combined value as a layer number of current uplink service scheduling, and can schedule the uplink service according to the determined layer number of uplink service scheduling, to ensure intensive-traffic transmission of uplink services in the 5G ground-to-air system.

In an embodiment, through S710 to S730, the base station can measure and demodulate the uplink service data information acquired from the terminal device, to obtain the inner loop value and the outer loop value of AMC respectively, and sum the inner loop value and the outer loop value of AMC to obtain the inner and outer loop combined value. Then, the scheduling module of the base station can determine the preset layer number of the inner and outer loop combined value according to the inner and outer loop combined value, determines the preset layer number as the layer number of current uplink service scheduling, and schedules the uplink service according to the determined layer number of uplink service scheduling, thereby improving accuracy of uplink data scheduling of the 5G ATG communication system.

Referring to FIG. 8, in an embodiment, S720 includes, but is not limited to, the following step.

At S810, in response to the inner and outer loop combined value being in a decision threshold interval corresponding to the $j^{th}$ layer in preset layer numbers, it is determined that the preset layer number to which the inner and outer loop combined value belongs is the $j^{th}$ layer, where j is a positive integer.

In an embodiment, the inner and outer loop combined value may be judged. When the inner and outer loop combined value is in the decision threshold interval corresponding to the $j^{th}$ layer in the preset layer numbers, it can be determined that the preset layer number to which the inner and outer loop combined value belongs is the $j^{th}$ layer.

It should be noted that a maximum quantity of uplink layers supported by the base station is j layers, where j is a positive integer.

It should be noted that the decision threshold interval corresponding to the $j^{th}$ layer may be set to [$Thr_j$, $Thr_{j+1}$), where $Thr_j$ represents a decision threshold corresponding to a layer number of j, [$Thr_j$, $Thr_{j+1}$) represents a decision threshold interval greater than or equal to $Th_j$, and less than $Thr_{j+1}$.

Referring to FIG. 9, in an embodiment, S720 further includes, but is not limited to, the following step.

At S910, in response to the inner and outer loop combined value being not in the decision threshold interval corresponding to the $j^{th}$ layer in the preset layer numbers, the $j^{th}$ layer is updated to the $(j+1)^{th}$ layer until the inner and outer loop combined value is in a decision threshold interval corresponding to the $(j+1)^{th}$ layer, and it is determined that the preset layer number to which the inner and outer loop combined value belongs is the $(j+1)^{th}$ layer.

In an embodiment, when the inner and outer loop combined value is not in the decision threshold interval corresponding to the $j^{th}$ layer, the inner and outer loop combined value may be judged layer by layer from the $j^{th}$ layer. When the inner and outer loop combined value is in the decision threshold interval corresponding to the $(j+1)^{th}$ layer, it can be determined that the preset layer number to which the inner and outer loop combined value belongs is the $(j+1)^{th}$ layer.

It should be noted that the layer-by-layer determination from the $j^{th}$ layer may be determination in ascending order of layer numbers from the $j^{th}$ layer or determination in descending order of layer numbers from the $j^{th}$ layer, which is not specifically limited in this embodiment.

Figure 10:
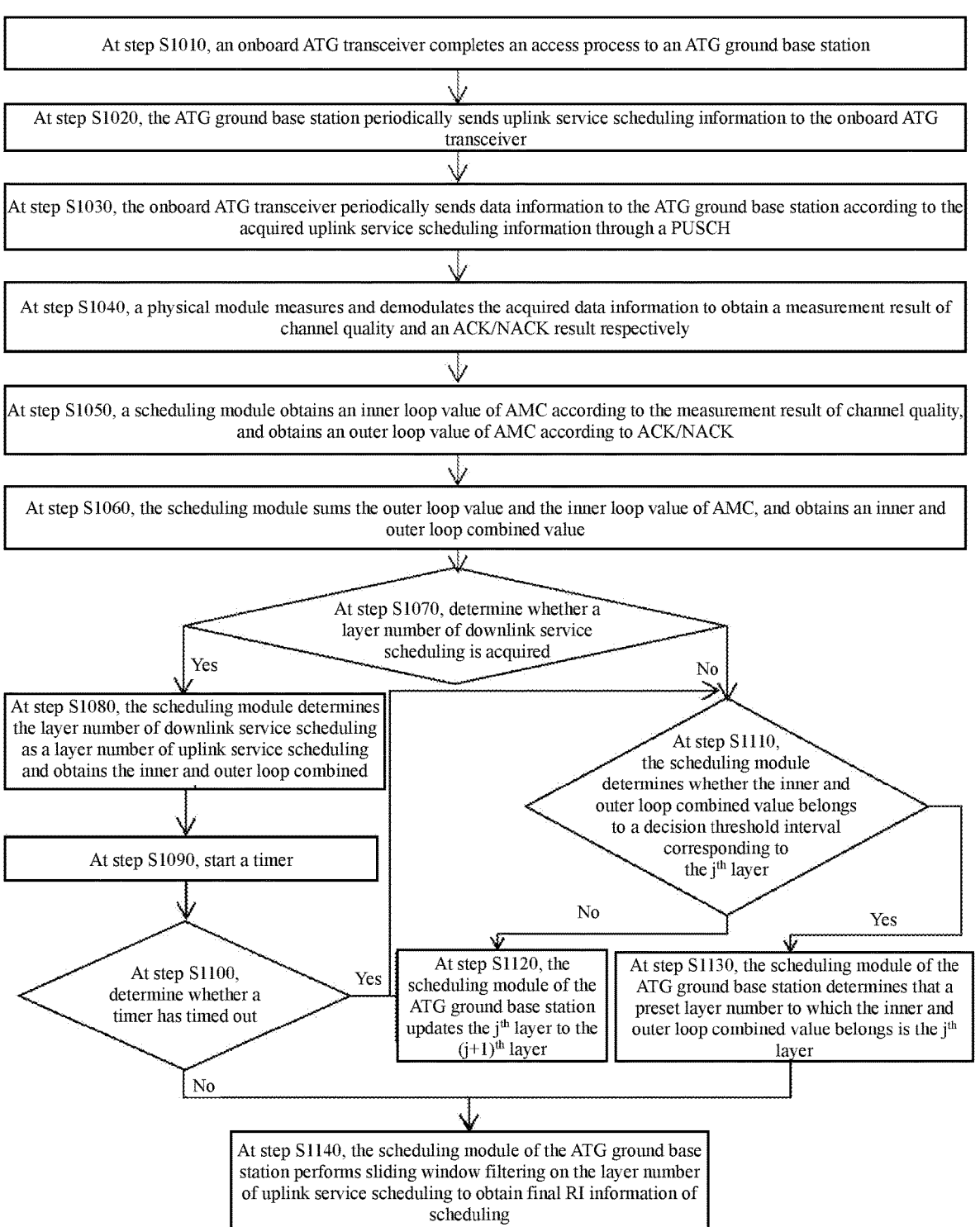
FIG. 10 is a flowchart of a scheduling method provided by another embodiment of the present disclosure.

Referring to FIG. 10, a flowchart of a scheduling method in another embodiment is depicted. The method is applied to the ATG communication system of FIG. 1, where the ATG communication system includes an onboard ATG transceiver and an ATG ground base station. In an embodiment, the scheduling method of the ATG communication system may include the following steps.

At S1010, the onboard ATG transceiver completes an access process to the ATG ground base station.

At S1020, the ATG ground base station periodically sends uplink service scheduling information to the onboard ATG transceiver.

At S1030, the onboard ATG transceiver periodically sends data information to the ATG ground base station according to the acquired uplink service scheduling information through a PUSCH.

At S1040, a physical module of the ATG ground base station measures and demodulates the acquired data information to obtain a measurement result of channel quality and an ACK/NACK result respectively.

At S1050, a scheduling module of the ATG ground base station obtains an inner loop value of AMC according to the measurement result of channel quality, and obtains an outer loop value of AMC according to ACK/NACK.

At S1060, the scheduling module of the ATG ground base station sums the outer loop value and the inner loop value of AMC to obtain an inner and outer loop combined value.

At S1070, the ATG ground base station determines whether a layer number of downlink service scheduling is acquired. If yes, the process proceeds to S1080; if not, the process proceeds to S1110.

At S1080, the scheduling module of the ATG ground base station determines the layer number of downlink service scheduling as a layer number of uplink service scheduling.

At S1090, the ATG ground base station starts a timer.

At S1100, the ATG ground base station determines whether the timer has timed out, if yes, the process proceeds to S1110; if not, the process proceeds to S1080.

At S1110, the scheduling module of the ATG ground base station determines whether the inner and outer loop combined value belongs to a decision threshold interval corresponding to the $j^{th}$ layer. If yes, the process proceeds to S1130; if not, the process proceeds to S1120.

At S1120, the scheduling module of the ATG ground base station updates the $j^{th}$ layer to the $(j+1)^{th}$ layer. The process proceeds to S1110.

At S1130, the scheduling module of the ATG ground base station determines that a preset layer number to which the inner and outer loop combined value belongs is the $j^{th}$ layer.

At S1140, the scheduling module of the ATG ground base station performs sliding window filtering on the layer number of uplink service scheduling to obtain final rank indicator (RI) information of scheduling.

In an embodiment, the onboard ATG transceiver completes an access process to the ATG ground base station. The ATG ground base station periodically sends uplink service scheduling information to the onboard ATG transceiver. The onboard ATG transceiver periodically sends data information to the ATG ground base station according to the uplink service scheduling information through a PUSCH. The physical module of the ATG ground base station measures and demodulates the data information to obtain a measurement result of channel quality and an ACK/NACK result respectively. The scheduling module of the ATG ground base station obtains an inner loop value of AMC according to the measurement result and also obtains an outer loop value of AMC according to ACK/NACK. The scheduling module of the ATG ground base station sums the outer loop value and the inner loop value of AMC to obtain an inner and outer loop combined value.

Then, the scheduling module of the ATG ground base station determines whether a layer number of downlink service scheduling is obtained. If yes, the layer number of downlink service scheduling is determined as the layer number of uplink service scheduling. If not, it is determined that the inner and outer loop combined value belongs to a decision threshold interval corresponding to which layer number. If the sum of the inner and outer loop values of AMC belongs to one of the decision threshold intervals, the layer number of uplink service scheduling is determined as a layer number corresponding to the decision interval. Finally, sliding window filtering is performed on the obtained layer number of uplink service scheduling to obtain a final layer number RI of uplink service scheduling. Compared with a scheduling method based on SRS information in some cases, the method in which the base station performs scheduling by using the data information sent through the PUSCH is more accurate, which ensures intensive-traffic transmission of uplink services in a 5G ground-to-air system.

It should be noted that RI information is rank indicator information, and is used to feed back the number of layers that can be separated from the channel to the base station. More layers indicate a larger amount of data that can be transmitted at the same time. The RI information can be used to indicate the number of valid data layers of a Physical Downlink Shared Channel (PDSCH), or the RI information can be used to indicate the number of code words (CW) that can be currently supported by the terminal device.

It should be noted that if the timer has been started in the timer starting step, the timer needs to be restarted.

Figure 11:
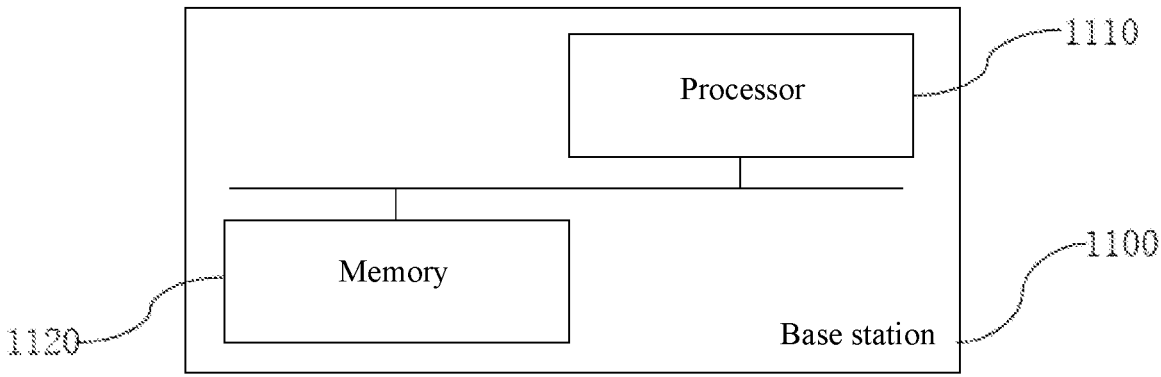
FIG. 11 is a schematic diagram of a base station provided by an embodiment of the present disclosure.

Another embodiment of the present disclosure further provides a base station. Referring to FIG. 11, the base station 1100 includes a memory 1120, a processor 1110, and a computer program stored in the memory 1120 and executable on the processor 1110, where the computer program, when executed by the processor 1110, causes the processor 1110 to implement the scheduling method of any one of the foregoing embodiments. The base station 1100 sends uplink service scheduling information to a terminal device; acquires data information sent by the terminal device according to the uplink service scheduling information through a PUSCH; determines a layer number of uplink service scheduling according to the data information; and schedules an uplink service according to the layer number of uplink service scheduling. Compared with a scheduling method based on SRS information in some cases, the method in which the base station 1100 performs scheduling by using the data information sent through the PUSCH in this embodiment of the present disclosure is more accurate, which improves accuracy of uplink data scheduling of a 5G ATG communication system.

Another embodiment of the present disclosure further provides a computer-readable storage medium which stores computer-executable instructions which, when executed by a processor or controller, for example, the processor in the base station of any of the embodiments above, can cause the processor to perform the scheduling method in any of the above embodiments, for example, to perform the above-described method steps S210 to S240 in FIGS. 2, S310 to S320 in FIGS. 3, S410 to S420 in FIG. 4, S510 in FIG. 5, S610 in FIGS. 6, S710 to S730 in FIG. 7, S810 in FIG. 8, S910 in FIG. 9, or S1010 to S1140 in FIG. 10.

The embodiments of the present disclosure have provided a scheduling method, a base station and a storage medium. The scheduling method includes: sending, by a base station, uplink service scheduling information to a terminal device; acquiring data information sent by the terminal device according to the uplink service scheduling information through a PUSCH; determining a layer number of uplink service scheduling according to the data information; and scheduling an uplink service according to the layer number of uplink service scheduling. Compared with a scheduling method based on SRS information in some cases, the method in which the base station schedules the terminal device by using the data information sent through the PUSCH in this embodiment of the present disclosure is more accurate, thereby improving accuracy of uplink data scheduling in a 5G ATG communication system.

It can be understood by those having ordinary skill in the art that all or some of the steps of the methods and systems disclosed above can be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software can be distributed on computer-readable media, which can include computer-readable storage media (or non-transitory media) and communication media (or transitory media). As well known to those having ordinary skill in the art, the term computer-readable storage medium includes volatile and nonvolatile, removable and non-removable media implemented in any method or technique for storing information, such as computer-readable instructions, data structures, program modules or other data. A computer storage medium includes but is not limited to RAM, ROM, EEPROM, flash memory or other memory technologies, CD-ROM, digital versatile disk (DVD) or other optical disk storage, cassettes, magnetic tapes, magnetic disk storage or other magnetic storage devices, or any other medium that can be configured to store desired information and can be accessed by a computer. Furthermore, it is well known to those having ordinary skill in the art that communication media typically contain computer-readable instructions, data structures, program modules or other data in a modulated data signal such as a carrier wave or other transmission mechanism, and can include any information transmission media.

The above is a detailed description of some embodiments of the present disclosure, but the present disclosure is not limited to the above-mentioned embodiments. Those having ordinary skill in the art can also make various equivalent modifications or replacements without departing from the scope of the present disclosure, and these equivalent modifications or replacements are all included in the scope defined by the claims of the present disclosure.

What is claimed is:

1. A scheduling method, performed by an Air To Ground (ATG) ground base station, comprising:

sending uplink service scheduling information to a an onboard ATG transceiver;

acquiring data information sent by the onboard ATG transceiver according to the uplink service scheduling information through a physical uplink shared channel (PUSCH), wherein the data information comprises downlink service data information;

obtaining a layer number of downlink service scheduling according to the downlink service data information in the data information;

determining the layer number of downlink service scheduling as a layer number of uplink service scheduling;

starting a timer;

in a case of re-acquiring the data information sent by the onboard ATG transceiver according to the uplink service scheduling information through the PUSCH, in response to the timer having not timed out, determining the layer number of downlink service scheduling as the layer number of uplink service scheduling; and scheduling an uplink service according to the layer number of uplink service scheduling.

2. The scheduling method of claim 1, wherein the data information further comprises uplink service data information, and the scheduling method further comprises:

in response to the timer having timed out, determining the layer number of uplink service scheduling according to the uplink service data information in the data information.

3. The scheduling method of claim 1, wherein the data information comprises uplink service data information, and determining a layer number of uplink service scheduling according to the data information comprises:

determining the layer number of uplink service scheduling according to the uplink service data information in the data information.

4. The scheduling method of claim 2, wherein determining the layer number of uplink service scheduling according to the uplink service data information in the data information comprises:

obtaining an inner loop value and an outer loop value of adaptive modulation and coding (AMC) according to the uplink service data information in the data information, and obtaining an inner and outer loop combined value according to the inner loop value and the outer loop value;

determining, according to the inner and outer loop combined value, a preset layer number to which the inner and outer loop combined value belongs; and determining the preset layer number to which the inner and outer loop combined value belongs as the layer number of uplink service scheduling.

5. The scheduling method of claim 4, wherein determining, according to the inner and outer loop combined value, a preset layer number to which the inner and outer loop combined value belongs comprises:

in response to the inner and outer loop combined value being in a decision threshold interval corresponding to the jth layer in preset layer numbers, determining that the preset layer number to which the inner and outer loop combined value belongs is the jth layer, wherein j is a positive integer.

6. The scheduling method of claim 5, wherein determining, according to the inner and outer loop combined value, a preset layer number to which the inner and outer loop combined value belongs further comprises:

in response to the inner and outer loop combined value being not in the decision threshold interval corresponding to the jth layer in the preset layer numbers, updating the jth layer to the (j+1)th layer until the inner and outer loop combined value is in a decision threshold interval corresponding to the (j+1)th layer, and determining that the preset layer number to which the inner and outer loop combined value belongs is the (j+1)th layer.

7. The scheduling method of claim 3, wherein determining the layer number of uplink service scheduling according to the uplink service data information in the data information comprises:

obtaining an inner loop value and an outer loop value of adaptive modulation and coding (AMC) according to the uplink service data information in the data information, and obtaining an inner and outer loop combined value according to the inner loop value and the outer loop value;

determining, according to the inner and outer loop combined value, a preset layer number to which the inner and outer loop combined value belongs; and determining the preset layer number to which the inner and outer loop combined value belongs as the layer number of uplink service scheduling.

8. An Air To Ground (ATG) ground base station, comprising a memory, a processor, and a computer program stored in the memory and executable by the processor, wherein the computer program, when executed by the processor, causes the processor to perform a scheduling method comprising:

sending uplink service scheduling information to an onboard ATG transceiver;

acquiring data information sent by the onboard ATG transceiver according to the uplink service scheduling information through a physical uplink shared channel (PUSCH), wherein the data information comprises downlink service data information;

obtaining a layer number of downlink service scheduling according to the downlink service data information in the data information;

determining the layer number of downlink service scheduling as a layer number of uplink service scheduling;

starting a timer;

in a case of re-acquiring the data information sent by the onboard ATG transceiver according to the uplink service scheduling information through the PUSCH, in response to the timer having not timed out, determining the layer number of downlink service scheduling as the layer number of uplink service scheduling; and scheduling an uplink service according to the layer number of uplink service scheduling.

9. The ATG ground base station of claim 8, wherein the data information further comprises uplink service data information, and the scheduling method further comprises:

in response to the timer having timed out, determining the layer number of uplink service scheduling according to the uplink service data information in the data information.

10. The ATG ground base station of claim 8, wherein the data information comprises uplink service data information, and determining a layer number of uplink service scheduling according to the data information comprises:

determining the layer number of uplink service scheduling according to the uplink service data information in the data information.

11. The ATG ground base station of claim 9, wherein determining the layer number of uplink service scheduling according to the uplink service data information in the data information comprises:

obtaining an inner loop value and an outer loop value of adaptive modulation and coding (AMC) according to the uplink service data information in the data information, and obtaining an inner and outer loop combined value according to the inner loop value and the outer loop value;

determining, according to the inner and outer loop combined value, a preset layer number to which the inner and outer loop combined value belongs; and determining the preset layer number to which the inner and outer loop combined value belongs as the layer number of uplink service scheduling.

12. The ATG ground base station of claim 11, wherein determining, according to the inner and outer loop combined value, a preset layer number to which the inner and outer loop combined value belongs comprises:

in response to the inner and outer loop combined value being in a decision threshold interval corresponding to the jth layer in preset layer numbers, determining that the preset layer number to which the inner and outer loop combined value belongs is the jth layer, wherein j is a positive integer.

13. The ATG ground base station of claim 12, wherein determining, according to the inner and outer loop combined value, a preset layer number to which the inner and outer loop combined value belongs further comprises:

in response to the inner and outer loop combined value being not in the decision threshold interval corresponding to the jth layer in the preset layer numbers, updating the jth layer to the (j+1)th layer until the inner and outer loop combined value is in a decision threshold interval corresponding to the (j+1)th layer, and determining that the preset layer number to which the inner and outer loop combined value belongs is the (j+1)th layer.

14. A non-transitory computer-readable storage medium, storing computer-executable instructions configured to cause a computer to perform a scheduling method performed by an Air To Ground (ATG) ground base station comprising:

sending uplink service scheduling information to an onboard ATG transceiver;

acquiring data information sent by the onboard ATG transceiver according to the uplink service scheduling information through a physical uplink shared channel (PUSCH), wherein the data information comprises downlink service data information;

obtaining a layer number of downlink service scheduling according to the downlink service data information in the data information;

determining the layer number of downlink service scheduling as a layer number of uplink service scheduling;

starting a timer;

in a case of re-acquiring the data information sent by the onboard ATG transceiver according to the uplink service scheduling information through the PUSCH, in response to the timer having not timed out, determining the layer number of downlink service scheduling as the layer number of uplink service scheduling; and scheduling an uplink service according to the layer number of uplink service scheduling.

15. The non-transitory computer-readable storage medium of claim 14, wherein the data information further comprises uplink service data information, and the scheduling method further comprises:

in response to the timer having timed out, determining the layer number of uplink service scheduling according to the uplink service data information in the data information.

16. The non-transitory computer-readable storage medium of claim 14, wherein the data information comprises uplink service data information, and determining a layer number of uplink service scheduling according to the data information comprises:

determining the layer number of uplink service scheduling according to the uplink service data information in the data information.

17. The non-transitory computer-readable storage medium of claim 15, wherein determining the layer number of uplink service scheduling according to the uplink service data information in the data information comprises:

obtaining an inner loop value and an outer loop value of adaptive modulation and coding (AMC) according to the uplink service data information in the data information, and obtaining an inner and outer loop combined value according to the inner loop value and the outer loop value;

determining, according to the inner and outer loop combined value, a preset layer number to which the inner and outer loop combined value belongs; and determining the preset layer number to which the inner and outer loop combined value belongs as the layer number of uplink service scheduling.

18. The non-transitory computer-readable storage medium of claim 17, wherein determining, according to the inner and outer loop combined value, a preset layer number to which the inner and outer loop combined value belongs comprises:

in response to the inner and outer loop combined value being in a decision threshold interval corresponding to the jth layer in preset layer numbers, determining that the preset layer number to which the inner and outer loop combined value belongs is the jth layer, wherein j is a positive integer.

19. The non-transitory computer-readable storage medium of claim 18, wherein determining, according to the inner and outer loop combined value, a preset layer number to which the inner and outer loop combined value belongs further comprises:

in response to the inner and outer loop combined value being not in the decision threshold interval corresponding to the jth layer in the preset layer numbers, updating the jth layer to the (j+1)th layer until the inner and outer loop combined value is in a decision threshold interval corresponding to the (j+1)th layer, and determining that the preset layer number to which the inner and outer loop combined value belongs is the (j+1)th layer.

20. The non-transitory computer-readable storage medium of claim 16, wherein determining the layer number of uplink service scheduling according to the uplink service data information in the data information comprises:

obtaining an inner loop value and an outer loop value of adaptive modulation and coding (AMC) according to the uplink service data information in the data information, and obtaining an inner and outer loop combined value according to the inner loop value and the outer loop value;

determining, according to the inner and outer loop combined value, a preset layer number to which the inner and outer loop combined value belongs; and determining the preset layer number to which the inner and outer loop combined value belongs as the layer number of uplink service scheduling.

* * * * *